United States Patent [19]

Maeda et al.

[11] 4,269,478
[45] May 26, 1981

[54] CONSTANT-SPEED SCANNING LENS SYSTEM

[75] Inventors: Haruo Maeda, Hino; Yuko Kobayashi, Hachiouji, both of Japan

[73] Assignee: Olympus Optical Co., Ltd., Tokyo, Japan

[21] Appl. No.: 83,656

[22] Filed: Oct. 11, 1979

[30] Foreign Application Priority Data

Oct. 16, 1978 [JP] Japan .................................. 53-127185

[51] Int. Cl.³ .................................................. G02B 9/60
[52] U.S. Cl. .................................... 350/465; 350/6.8
[58] Field of Search ............................... 350/216, 6.8

[56] References Cited

U.S. PATENT DOCUMENTS

3,749,478  7/1973  Nakagawa et al. .................. 350/216

FOREIGN PATENT DOCUMENTS

2911528  9/1979  Fed. Rep. of Germany ........... 350/6.8

*Primary Examiner*—Paul A. Sacher
*Attorney, Agent, or Firm*—Cushman, Darby & Cushman

[57] ABSTRACT

A constant-speed scanning lens system comprising a first, second, third, fourth and fifth lens components, the first lens component being a positive meniscus lens arranged concave toward the incident side, the second lens component being a negative lens, the third, fourth and fifth lens components being positive meniscus lenses respectively arranged concave toward the incident side, the constant-speed scanning lens system having a small F number, wide field angle and compact size.

10 Claims, 11 Drawing Figures

FIG. 3
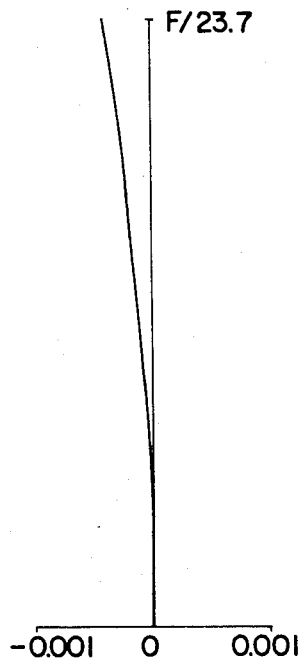
SPHERICAL ABERRATION
F/23.7
−0.001  0  0.001
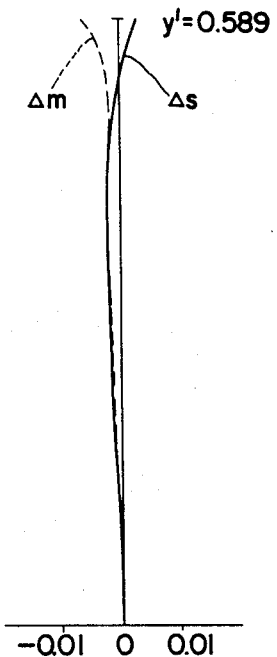
ASTIGMATISM
y'=0.589
Δm    Δs
−0.01  0  0.01
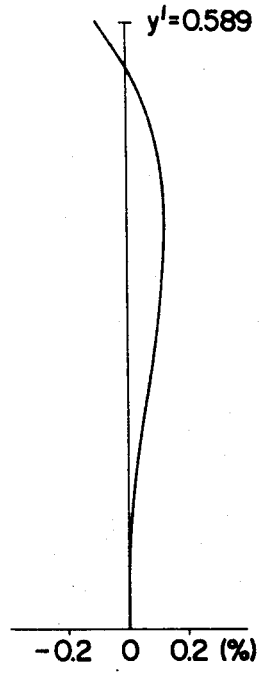
DISTORTION
y'=0.589
−0.2  0  0.2 (%)
FIG. 4
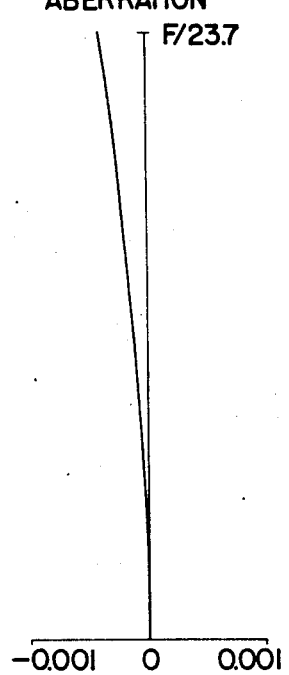
SPHERICAL ABERRATION
F/23.7
−0.001  0  0.001
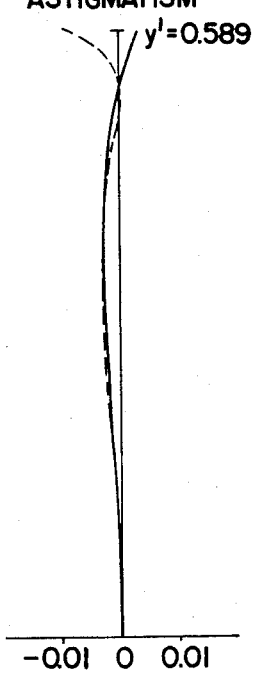
ASTIGMATISM
y'=0.589
−0.01  0  0.01
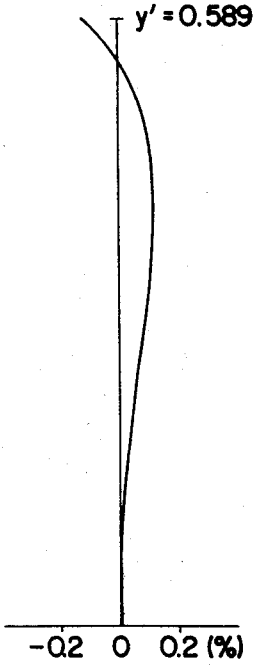
DISTORTION
y'=0.589
−0.2  0  0.2 (%)

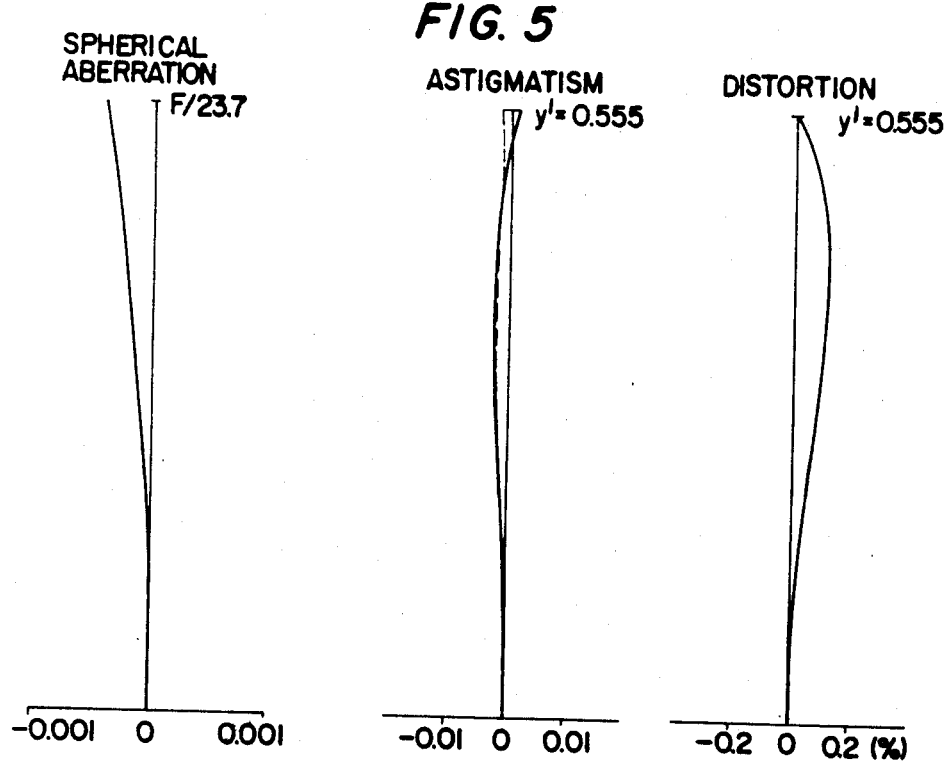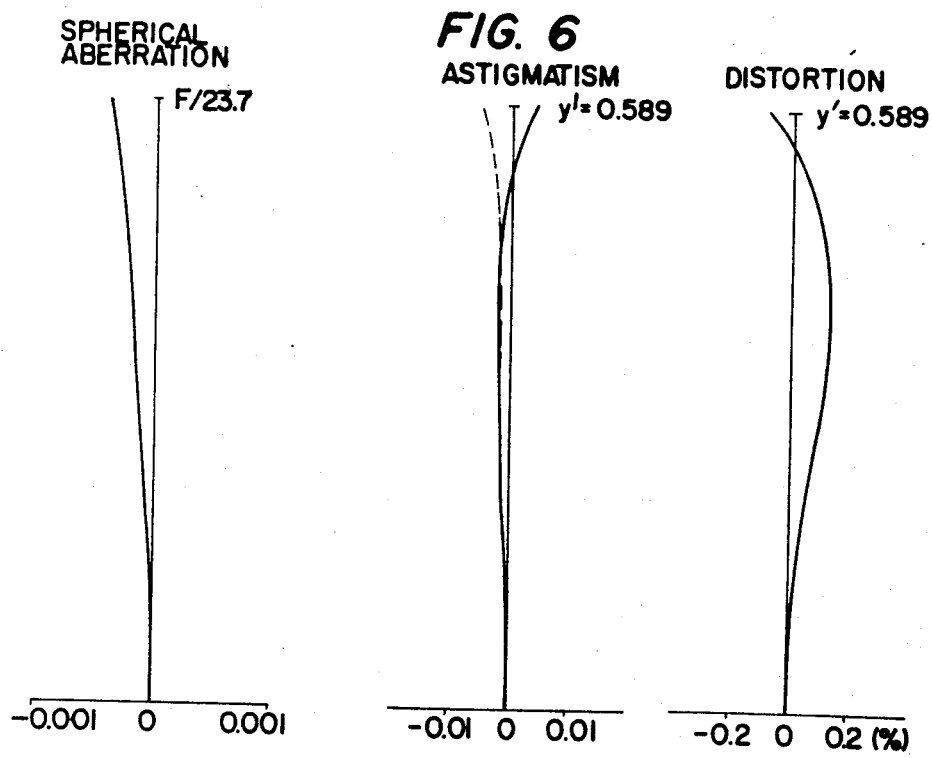

FIG. 7

| SPHERICAL ABERRATION | ASTIGMATISM | DISTORTION |
|---|---|---|
| F/23.7 | y'=0.555 | y'=0.555 |
| −0.001  0  0.001 | −0.01  0  0.01 | −0.2  0  0.2 (%) |

FIG. 8

| SPHERICAL ABERRATION | ASTIGMATISM | DISTORTION |
|---|---|---|
| F/29.15 | y'=0.555 | y'=0.555 |
| −0.002  0  0.002 | −0.01  0  0.01 | −0.2  0  0.2 (%) |

FIG. 9
SPHERICAL ABERRATION
F/24.77
ASTIGMATISM
y'=0.555
DISTORTION
y'=0.555
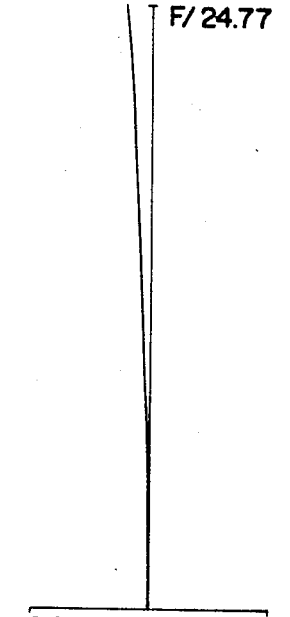
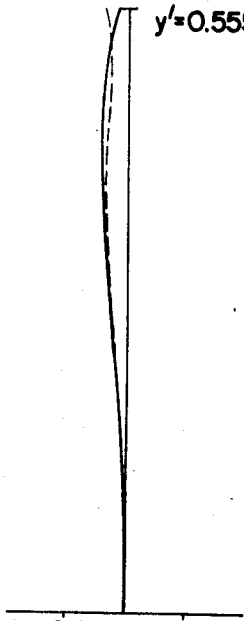
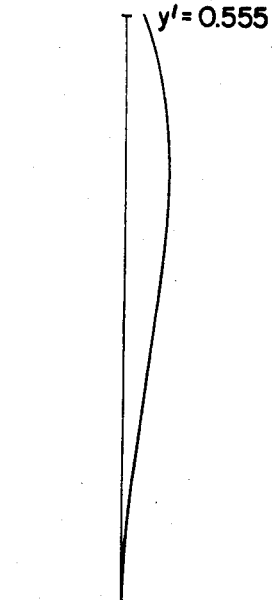
FIG. 10
SPHERICAL ABERRATION
F/35
ASTIGMATISM
y'=0.589
DISTORTION
y'=0.589
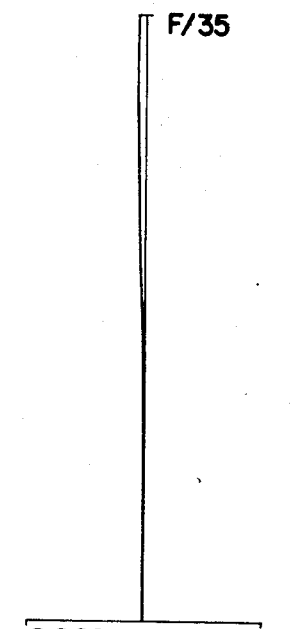
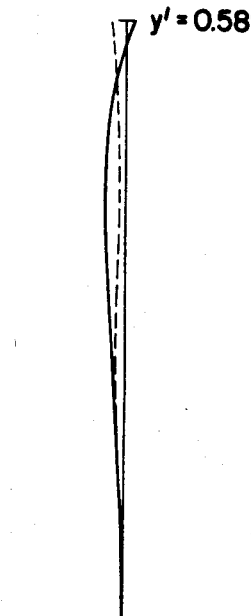
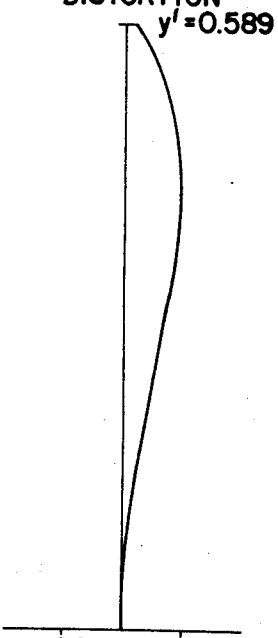

CONSTANT-SPEED SCANNING LENS SYSTEM

BACKGROUND OF THE INVENTION

1. Field of the Invention

The present invention relates to a constant-speed scanning lens system to be used in a flat-surface scanning optical system.

2. Description of the Prior Art

As a flat-surface scanning optical system, an optical system as shown in FIG. 1 is used. In this optical system, the light beam from the light source 1 such as a laser means is reflected by a polygonal rotating mirror 2 (an oscillating mirror is sometimes used instead) and, then, imaged on a scanning surface 4 by means of an imaging lens 3. When the polygonal rotating mirror 2 is rotated in the direction of arrowhead A, the light beam spot moves in the direction of arrowhead B on the scanning surface 4. At that time, the light beam spot should move at a constant speed on the scanning surface. Therefore, as the imaging lens for a flat-surface scanning optical system, it is impossible to use a general photographic lens or the like. In case of such lenses as general photographic lenses for which distortion is corrected favourably, the relation among the field angle $\theta$, focal length f and image height y is expressed by the following formula (i).

$$y = f \cdot \tan\theta \tag{i}$$

In other words, the image height y (the distance from the center of scanning surface to the beam spot in case of beam-spot scanning) varies in proportion to $\tan\theta$. When, therefore, the polygonal rotating mirror is rotated at a constant speed, the moving speed of beam spot becomes higher when the beam spot comes nearer the margin of scanning surface because the varying rate of $\theta$ is constant. As a countermeasure for eliminating the above disadvantage so that the beam spot moves at a constant speed on the scanning surface, it may be theoretically possible to adequately control the rotational speed of polygonal rotating mirror instead of rotating it at a constant speed. However, this method is not practicable because there are many difficult problems in practice.

Therefore, in the known method, it is arranged to move the beam spot at a constant speed by using a lens called an f$\theta$ lens which is different from general photographic lenses. The f$\theta$ lens is arranged so that the aforementioned image height y, focal length f and field angle $\theta$ have the relation expressed by the following formula (ii).

$$y = f\theta \tag{ii}$$

When a lens which satisfies the above formula (ii) is used, y varies at a constant rate when the polygonal rotating mirror rotates at a constant speed and, therefore, the beam spot moves at a constant speed.

The above formula (ii) is satisfied when the lens is designed based on general photographic lenses or the like so that barrel distortion is purposely caused.

Generally, distortion D is expressed by the following formula.

$$D = \frac{Y - f \cdot \tan\theta}{f \cdot \tan\theta} \times 100 \, (\%)$$

In the above formula, reference symbol Y' represents the actual image height. General photographic lenses and the like are usually designed so that D becomes a value near zero.

On the other hand, in case of an f$\theta$ lens, aberration is corrected so that D' expressed by the following formula becomes zero.

$$D' = \frac{Y - f\theta}{f\theta} \times 100 \, (\%)$$

For an actual f$\theta$ lens, it is desired that the beam diameter is small and, consequently, the beam spot diameter is small in addition to the fact that the scanning speed should be constant, i.e., the afore-mentioned formula (ii) should be satisfied. The beam spot diameter d is expressed by the following formula (iii) where reference symbol F represents the F number of the lens system, reference symbol $\lambda$ represents the wavelength of the light to be used, and reference symbol k represents the constant.

$$d = k \cdot F \cdot \lambda \tag{iii}$$

In the above formula (iii), k and $\lambda$ are pre-determined values and, therefore, only F can be varied when designing the lens system. To make the beam spot diameter small, it is therefore necessary to make F small.

On the other hand, to correct offaxial aberrations favourably, it is preferable that $\theta$ is smaller. To make $\theta$ small when the size of scanning surface is pre-determined, it is necessary to make f large. However, to obtain the lens system of the same F number, it is necessary to make the lens diameter large when f is made large.

When $\theta$ is made small, it is necessary to make the number of faces n of polygonal rotating mirror large. Besides, when f is made large, it is necessary to make the size of each face of polygonal rotating mirror large. This is due to the following reason. That is, as the F number should be small as explained in the above, it is necessary to make the lens diameter large when f is made large and, consequently, the beam diameter becomes large. Therefore, it becomes necessary to make the size of each face of polygonal rotating mirror large. As the size of polygonal rotating mirror is decided by the number of faces and size of each face, the polygonal rotating mirror should be made doubly large in order to make $\theta$ small and f large as described in the above. When the polygonal rotating mirror is large, it is difficult to manufacture it accurately and its cost becomes high. Therefore, it is not desirable to make the polygonal rotating mirror large.

The relation between $\theta$ and number of faces n of polygonal rotating mirror is expressed by the following formula (iv).

$$\theta < 360°/n \tag{iv}$$

The effective scanning rate in a scanning system is expressed by the following formula.

$$\text{Effective scanning rate} = \frac{\text{Effective scanning time}}{\text{Total scanning time}}$$

This corresponds to the ratio between the length of scanning surface and scanning length by each face of polygonal rotating mirror. It is not preferable to make the scanning length by each face of polygonal rotating mirror unnecessarily long. Therefore, it is not preferable to make the value of n smaller than $n_0$, which represents the maximum value of n when $\theta$ in the formula (iv) is a certain value, because the efficiency becomes low. Therefore, to make the value of n small, it is necessary to make the value of $\theta$ as large as possible, and a wide-angle lens is required as the f$\theta$ lens.

Due to the above-mentioned reasons, it is preferable that the f$\theta$ lens has a small F number, wide field angle, compact size and favourably corrected offaxial aberrations.

Out of known f$\theta$ lenses, there are telecentric lens systems. For those f$\theta$ lenses, however, the lens diameter larger than the size of image surface is required and, therefore, the lens becomes extremely large.

Besides, f$\theta$ lenses which are not telecentric lens systems are also known. However, those f$\theta$ lenses have extremely large F numbers, i.e., about F/60, and it is impossible to obtain a small beam spot.

SUMMARY OF THE INVENTION

It is, therefore, a primary object of the present invention to provide a constant-speed scanning lens system (f$\theta$ lens) and, more particularly, a constant-speed scanning lens system (f$\theta$ lens) having a small F number, wide field angle and compact size.

The constant-speed scanning lens system according to the present invention has five-component five-element lens configuration, i.e., the lens system according to the present invention comprises a first, second, third, fourth and fifth lens components in the order from the incident side. The first lens component is a positive meniscus lens which is arranged concave toward the incident side, the second lens component is a negative lens, and the third, fourth and fifth lens components are positive meniscus lenses which are respectively arranged concave toward the incident side. Besides, the constant-speed scanning lens system according to the present invention satisfies the following conditions.

(1) $1.02 < |r_2/r_3| < 1.12$
(2) $0.013f < d_4 < 0.016f$
(3) $-0.245f < r_1 < -0.185f$
(4) $-6.8f < r_5 < -1.7f$

In the above-mentioned conditions, reference symbols $r_1$, $r_2$, $r_3$ and $r_5$ respectively represent radii of curvature of respective surfaces of the first lens component, surface on the incident side of the second lens component and surface on the incident side of the third lens component, reference symbol $d_4$ represents the airspace between the second and third lens components, and reference symbol f represents the focal length of the lens system as a whole.

The lens system according to the present invention is arranged to cause negative distortion, which is a characteristic of an f$\theta$ lens, and is thereby arranged so that the value of D' of $D' = (y' - f\theta)/f\theta$ becomes a value near zero. Besides, in order to obtain a beam spot diameter which is near the diffractive limit, the lens system according to the present invention is arranged so that spherical aberration at the portion near the center of lens is corrected favourably and that curving of image surface and coma at the offaxial portion are also corrected favourably. For attaining these purposes, the lens system according to the present invention is arranged to satisfy the afore-mentioned four conditions.

If $|r_2/r_3|$ in the condition (1) becomes larger than the upper limit, i.e., 1.12, spherical aberration will be overcorrected and, moreover, the meridional image surface will curve toward the negative side. If $|r_2/r_3|$ becomes smaller than the lower limit, i.e., 1.02, spherical aberration will be undercorrected.

If $d_4$ in the condition (2) becomes larger than the upper limit, i.e., 0.016f, the image surface will curve toward the negative side and, at the same time, unnecessarily large negative distortion will be caused. If $d_4$ becomes smaller than the lower limit, i.e., 0.013f, symmetry of coma will be disturbed.

If $r_1$ in the condition (3) becomes larger than the upper limit, i.e., $-0.185f$, spherical aberration will be overcorrected. If $r_1$ becomes smaller than the lower limit, i.e., $-0.245f$, unnecessarily large negative distortion will be caused and spherical aberration will be undercorrected.

If $r_5$ in the condition (4) becomes larger than the upper limit, i.e., $-1.7f$, offaxial coma will become large. If $r_5$ becomes smaller than the lower limit, i.e., $-6.8f$, the image surface will curve toward the negative side and unnecessarily large negative distortion will be caused.

BRIEF DESCRIPTION OF THE DRAWINGS

FIGS. 3 through 11 respectively show graphs illustrating aberration curves of the lens system according to the present invention.

DESCRIPTION OF THE PREFERRED EMBODIMENTS

Figure 1:
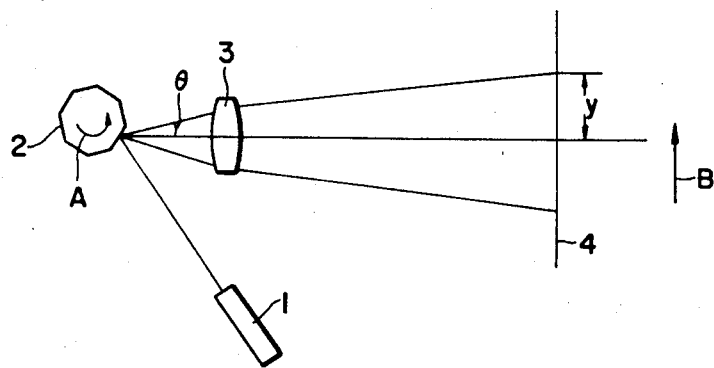
FIG. 1 shows a schematic diagram illustrating a flat-surface scanning optical system employing a polygonal rotating mirror.
Figure 2:
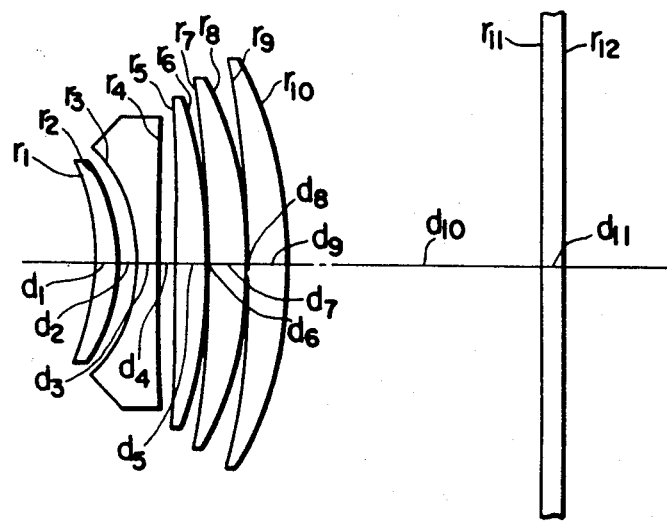
FIG. 2 shows a sectional view of the constant-speed scanning lens system according to the present invention.
Figure 11:
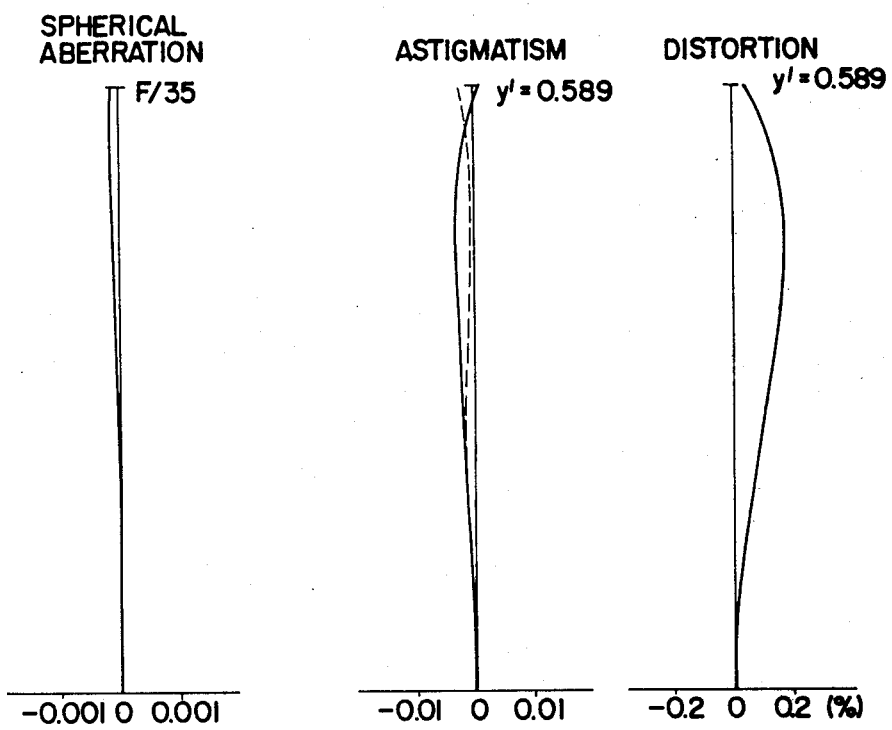

Now, the preferred embodiments of the constant-speed scanning lens system according to the present invention are shown below.

| Embodiment 1 | | | |
|---|---|---|---|
| $r_1 = -0.2012$ | | | |
| | $d_1 = 0.0171$ | $n_1 = 1.63612$ | $\nu_1 = 55.4$ |
| $r_2 = -0.1583$ | | | |
| | $d_2 = 0.0191$ | | |
| $r_3 = -0.1501$ | | | |
| | $d_3 = 0.0163$ | $n_2 = 1.56459$ | $\nu_2 = 42.8$ |
| $r_4 = 39.1220$ | | | |
| | $d_4 = 0.0138$ | | |
| $r_5 = -3.5473$ | | | |
| | $d_5 = 0.0298$ | $n_3 = 1.61985$ | $\nu_3 = 53.2$ |
| $r_6 = -0.6373$ | | | |
| | $d_6 = 0.0008$ | | |
| $r_7 = -1.0971$ | | | |
| | $d_7 = 0.0420$ | $n_4 = 1.61985$ | $\nu_4 = 53.2$ |
| $r_8 = -0.3136$ | | | |
| | $d_8 = 0.0008$ | | |
| $r_9 = -1.2448$ | | | |
| | $d_9 = 0.0393$ | $n_5 = 1.61985$ | $\nu_5 = 53.2$ |
| $r_{10} = -0.4265$ | | | |
| | $f = 1$ | $F/23.7$ | $y = 0.589$ |
| | $|r_2/r_3| = 1.054$ | $\lambda = 632.8$ nm | |

| Embodiment 2 | | | |
|---|---|---|---|
| $r_1 = -0.2037$ | | | |
| | $d_1 = 0.0171$ | $n_1 = 1.63612$ | $\nu_1$ 32 55.4 |
| $r_2 = -0.1573$ | | | |
| | $d_2 = 0.0191$ | | |
| $r_3 = -0.1479$ | | | |

-continued

Embodiment 2

| | | | |
|---|---|---|---|
| | $d_3 = 0.0163$ | $n_2 = 1.56459$ | $\nu_2 = 42.8$ |
| $r_4 = 5.4560$ | $d_4 = 0.0138$ | | |
| $r_5 = -6.1854$ | $d_5 = 0.0298$ | $n_3 = 1.61985$ | $\nu_3 = 53.2$ |
| $r_6 = -0.5090$ | $d_6 = 0.0008$ | | |
| $r_7 = -1.0001$ | $d_7 = 0.0420$ | $n_4 = 1.61985$ | $\nu_4 = 53.2$ |
| $r_8 = -0.3453$ | $d_8 = 0.0008$ | | |
| $r_9 = -0.9159$ | $d_9 = 0.0393$ | $n_5 = 1.61985$ | $\nu_5 = 53.2$ |
| $r_{10} = -0.3684$ | | | |
| | $f = 1$ | $F/23.7$ | $Y = 0.589$ |
| | $|r_2/r_3| = 1.064$ | $\lambda = 632.8$ nm | |

Embodiment 3

| | | | |
|---|---|---|---|
| $r_1 = -0.1993$ | $d_1 = 0.0171$ | $n_1 = 1.63612$ | $\nu_1 = 55.4$ |
| $r_2 = -0.1565$ | $d_2 = 0.0191$ | | |
| $r_3 = -0.1488$ | $d_3 = 0.0163$ | $n_2 = 1.56459$ | $\nu_2 = 42.8$ |
| $r_4 = \infty$ | $d_4 = 0.0138$ | | |
| $r_5 = -3.3866$ | $d_5 = 0.0298$ | $n_3 = 1.61985$ | $\nu_3 = 53.2$ |
| $r_6 = -0.5834$ | $d_6 = 0.0008$ | | |
| $r_7 = -1.0150$ | $d_7 = 0.0420$ | $n_4 = 1.61985$ | $\nu_4 = 53.2$ |
| $r_8 = -0.3194$ | $d_8 = 0.0008$ | | |
| $r_9 = -1.1748$ | $d_9 = 0.0393$ | $n_5 = 1.61985$ | $\nu_5 = 53.2$ |
| $r_{10} = -0.4171$ | | | |
| $r_{11} = \infty$ | $d_{10} = 1.2166$ | | |
| | $d_{11} = 0.0135$ | $n_6 = 1.51462$ | $\nu_6 = 64.1$ |
| $r_{12} = \infty$ | | | |
| | $f = 1$ | $F/23.7$ | $y = 0.555$ |
| | $|r_2/r_3| = 1.052$ | $\lambda = 632.8$ nm | |

Embodiment 4

| | | | |
|---|---|---|---|
| $r_1 = -0.2023$ | $d_1 = 0.0171$ | $n_1 = 1.63612$ | $\nu_1 = 55.4$ |
| $r_2 = -0.1586$ | $d_2 = 0.0191$ | | |
| $r_3 = -0.1500$ | $d_3 = 0.0163$ | $n_2 = 1.56459$ | $\nu_2 = 42.8$ |
| $r_4 = 78.8505$ | $d_4 = 0.0145$ | | |
| $r_5 = -3.3040$ | $d_5 = 0.0298$ | $n_3 = 1.61985$ | $\nu_3 = 53.2$ |
| $r_6 = -0.6149$ | $d_6 = 0.0008$ | | |
| $r_7 = -1.1101$ | $d_7 = 0.0420$ | $n_4 = 1.61985$ | $\nu_4 = 53.2$ |
| $r_8 = -0.3137$ | $d_8 = 0.0008$ | | |
| $r_9 = -1.1696$ | $d_9 = 0.0393$ | $n_5 = 1.61985$ | $\nu_5 = 53.2$ |
| $r_{10} = -0.4282$ | | | |
| | $f = 1$ | $F/23.7$ | $y = 0.589$ |
| | $|r_2/r_3| = 1.058$ | $\lambda = 632.8$ nm | |

Embodiment 5

| | | | |
|---|---|---|---|
| $r_1 = -0.1932$ | $d_1 = 0.0171$ | $n_1 = 1.63612$ | $\nu_1 = 55.4$ |
| $r_2 = -0.1525$ | $d_2 = 0.0191$ | | |
| $r_3 = -0.1472$ | $d_3 = 0.0163$ | $n_2 = 1.56459$ | $\nu_2 = 42.8$ |
| $r_4 = -4.0709$ | $d_4 = 0.0133$ | | |
| $r_5 = -2.2468$ | $d_5 = 0.0298$ | $n_3 = 1.61985$ | $\nu_3 = 53.2$ |
| $r_6 = -0.5051$ | $d_6 = 0.0008$ | | |
| $r_7 = -0.7321$ | $d_7 = 0.0420$ | $n_4 = 1.61985$ | $\nu_4 = 53.2$ |
| $r_8 = -0.3286$ | $d_8 = 0.0008$ | | |
| $r_9 = -1.4918$ | $d_9 = 0.0393$ | $n_5 = 1.61985$ | $\nu_5 = 53.2$ |
| $r_{10} = -0.4171$ | $d_{10} = 1.2166$ | | |
| $r_{11} = \infty$ | $d_{11} = 0.0135$ | $n_6 = 1.51462$ | $\nu_6 = 64.1$ |
| $r_{12} = \infty$ | | | |
| | $f = 1$ | $F/23.7$ | $y = 0.555$ |
| | $|r_2/r_3| = 1.036$ | $\lambda = 632.8$ nm | |

Embodiment 6

| | | | |
|---|---|---|---|
| $r_1 = -0.2104$ | $d_1 = 0.0200$ | $n_1 = 1.64488$ | $\nu_1 = 60.1$ |
| $r_2 = -0.1608$ | $d_2 = 0.0184$ | | |
| $r_3 = -0.1498$ | $d_3 = 0.0195$ | $n_2 = 1.57343$ | $\nu_2 = 42.8$ |
| $r_4 = 7.7024$ | $d_4 = 0.0154$ | | |
| $r_5 = -4.4646$ | $d_5 = 0.0274$ | $n_3 = 1.62791$ | $\nu_3 = 58.2$ |
| $r_6 = -0.5157$ | $d_6 = 0.0022$ | | |
| $r_7 = -1.1407$ | $d_7 = 0.0362$ | $n_4 = 1.62791$ | $\nu_4 = 58.2$ |
| $r_8 = -0.3560$ | $d_8 = 0.0022$ | | |
| $r_9 = -0.8187$ | $d_9 = 0.0350$ | $n_5 = 1.62791$ | $\nu_5 = 58.2$ |
| $r_{10} = -0.3713$ | $d_{10} = 1.2153$ | | |
| $r_{11} = \infty$ | $d_{11} = 0.0135$ | $n_6 = 1.52002$ | $\nu_6 = 64.1$ |
| $r_{12} = \infty$ | | | |
| | $f = 1$ | $F/29.15$ | $y = 0.555$ |
| | $|r_2/r_3| = 1.073$ | $\lambda = 514.5$ nm | |

Embodiment 7

| | | | |
|---|---|---|---|
| $r_1 = -0.2138$ | $d_1 = 0.0198$ | $n_1 = 1.64384$ | $\nu_1 = 55.4$ |
| $r_2 = -0.1614$ | $d_2 = 0.0193$ | | |
| $r_3 = -0.1497$ | $d_3 = 0.0190$ | $n_2 = 1.57343$ | $\nu_2 = 42.8$ |
| $r_4 = 26.5199$ | $d_4 = 0.0153$ | | |
| $r_5 = -3.3375$ | $d_5 = 0.0271$ | $n_3 = 1.62768$ | $\nu_3 = 53.2$ |
| $r_6 = -0.5019$ | $d_6 = 0.0027$ | | |
| $r_7 = -1.1722$ | $d_7 = 0.0371$ | $n_4 = 1.62768$ | $\nu_4 = 53.2$ |
| $r_8 = -0.3583$ | $d_8 = 0.0027$ | | |
| $r_9 = -0.7758$ | $d_9 = 0.0342$ | $n_5 = 1.62768$ | $\nu_5 = 53.2$ |
| $r_{10} = -0.3722$ | | | |
| | $f = 1$ | $F/24.77$ | $y = 0.555$ |

-continued

Embodiment 7

| $|r_2/r_3| = 1.078$ | $\lambda = 514.5$ nm |
|---|---|

Embodiment 8

| | | | |
|---|---|---|---|
| $r_1 = -0.2216$ | | | |
| | $d_1 = 0.0190$ | $n_1 = 1.64384$ | $\nu_1 = 55.4$ |
| $r_2 = -0.1656$ | | | |
| | $d_2 = 0.0200$ | | |
| $r_3 = -0.1511$ | | | |
| | $d_3 = 0.0244$ | $n_2 = 1.57343$ | $\nu_2 = 42.8$ |
| $r_4 = 6.8525$ | | | |
| | $d_4 = 0.0153$ | | |
| $r_5 = -4.7140$ | | | |
| | $d_5 = 0.0271$ | $n_3 = 1.62768$ | $\nu_3 = 53.2$ |
| $r_6 = -0.4990$ | | | |
| | $d_6 = 0.0081$ | | |
| $r_7 = -1.2190$ | | | |
| | $d_7 = 0.0298$ | $n_4 = 1.62768$ | $\nu_4 = 53.2$ |
| $r_8 = -0.3637$ | | | |
| | $d_8 = 0.0081$ | | |
| $r_9 = -0.7141$ | | | |
| | $d_9 = 0.0298$ | $n_5 = 1.62768$ | $\nu_5 = 53.2$ |
| $r_{10} = -0.3638$ | | | |
| | $f = 1$ | $F/35$ | $y = 0.589$ |
| | $|r_2/r_3| = 1.096$ | $\lambda = 514.5$ nm | |

Embodiment 9

| | | | |
|---|---|---|---|
| $r_1 = -0.2354$ | | | |
| | $d_1 = 0.0187$ | $n_1 = 1.64384$ | $\nu_1 = 55.4$ |
| $r_2 = -0.1691$ | | | |
| | $d_2 = 0.0183$ | | |
| $r_3 = -0.1525$ | | | |
| | $d_3 = 0.0279$ | $n_2 = 1.57343$ | $\nu_2 = 42.8$ |
| $r_4 = 5.1238$ | | | |
| | $d_4 = 0.0153$ | | |
| $r_5 = -5.8207$ | | | |
| | $d_5 = 0.0271$ | $n_3 = 1.62768$ | $\nu_3 = 53.2$ |
| $r_6 = -0.6053$ | | | |
| | $d_6 = 0.0081$ | | |
| $r_7 = -1.2320$ | | | |
| | $d_7 = 0.0298$ | $n_4 = 1.62768$ | $\nu_4 = 53.2$ |
| $r_8 = -0.3855$ | | | |
| | $d_8 = 0.0081$ | | |
| $r_9 = -0.8546$ | | | |
| | $d_9 = 0.0298$ | $n_5 = 1.62768$ | $\nu_5 = 53.2$ |
| $r_{10} = -0.3529$ | | | |
| | $f = 1$ | $F/35$ | $y = 0.589$ |
| | $|r_2/r_3| = 1.109$ | $\lambda = 514.5$ nm | |

In the above embodiments, reference symbols $r_1$ through $r_{12}$ respectively represent radii of curvature of respective lens surfaces, reference symbols $d_1$ through $d_{11}$ respectively represent thicknesses of respective lenses and airspaces between lenses, reference symbols $n_1$ through $n_6$ respectively represent refractive indices of respective lenses at the particular wavelength $\lambda$ (632.8 nm for Embodiments 1 through 5 and 514.5 nm for Embodiments 6 through 9), and reference symbols $\nu_1$ through $\nu_6$ respectively represent Abbe's numbers of respective lenses for d-line.

Out of the above embodiments, Embodiments 3, 5 and 6 respectively show the numerical data when a cover glass is arranged in front of the scanning surface. The respective surfaces of the cover glass are represented by reference symbols $r_{11}$ and $r_{12}$, airspace between the final lens surface and cover glass is represented by reference symbol $d_{10}$, thickness of the cover glass is represented by reference symbol $d_{11}$, and refractive index and Abbe's number of the cover glass are respectively represented by reference symbols $n_6$ and $\nu_6$. Besides, the graphs illustrating the aberration curves of these embodiments are shown in the state that the cover glass is included.

We claim:

1. A constant-speed scanning lens system comprising a first, second, third, fourth and fifth lens components, said first lens component being a positive meniscus lens arranged concave toward the incident side, said second lens component being a negative lens, said third lens component being a positive meniscus lens arranged concave toward the incident side, said fourth lens component being a positive meniscus lens arranged concave toward the incident side, said fifth lens component being a positive meniscus lens arranged concave toward the incident side, said constant-speed scanning lens system satisfying the following conditions:

(1) $1.02 < |r_2/r_3| < 1.12$
    (2) $0.013f < d_4 < 0.016f$
    (3) $-0.245f < r_1 < -0.185f$
    (4) $-6.8f < r_5 < -1.7f$ wherein reference symbols $r_1$, $r_2$, $r_3$ and $r_5$ respectively represent radii of curvature of respective surfaces of the first lens component, surface on the incident side of the second lens component and surface on the incident side of the third lens component, reference symbol $d_4$ represents the airspace between the second and third lens components, and reference symbol $f$ represents the focal length of the lens systems as a whole.

2. A constant-speed scanning lens system according to claim 1, in which said constant-speed scanning lens system has the following numerical data:

| | | | |
|---|---|---|---|
| $r_1 = -0.2012$ | | | |
| | $d_1 = 0.0171$ | $n_1 = 1.63612$ | $\nu_1 = 55.4$ |
| $r_2 = -0.1583$ | | | |
| | $d_2 = 0.0191$ | | |
| $r_3 = -0.1501$ | | | |
| | $d_3 = 0.0163$ | $n_2 = 1.56459$ | $\nu_2 = 42.8$ |
| $r_4 = 39.1220$ | | | |
| | $d_4 = 0.0138$ | | |
| $r_5 = -3.5473$ | | | |
| | $d_5 = 0.0298$ | $n_3 = 1.61985$ | $\nu_3 = 53.2$ |
| $r_6 = -0.6373$ | | | |
| | $d_6 = 0.0008$ | | |
| $r_7 = -1.0971$ | | | |
| | $d_7 = 0.0420$ | $n_4 = 1.61985$ | $\nu_4 = 53.2$ |
| $r_8 = -0.3136$ | | | |
| | $d_8 = 0.0008$ | | |
| $r_9 = -1.2448$ | | | |
| | $d_9 = 0.0393$ | $n_5 = 1.61985$ | $\nu_5 = 53.2$ |
| $r_{10} = -0.4265$ | | | |
| | $f = 1$ | $F/23.7$ | $y = 0.589$ |
| | $|r_2/r_3| = 1.054$ | $\lambda = 632.8$ nm | | wherein reference symbols $r_1$ through $r_{10}$ respectively represent radii of curvature of respective lens surfaces, reference symbols $d_1$ through $d_9$ respectively represent thicknesses of respective lenses and airspaces between lenses, reference symbols $n_1$ through $n_5$ respectively represent refractive indices of respective lenses at the wavelength of 632.8 nm, reference symbols $\nu_1$ through $\nu_5$ respectively represent Abbe's numbers of respective lenses for d-line, reference symbol $f$ represents the focal length of the lens system as a whole, reference symbol $F$ represents the F number, and reference symbol $y$ represents the image height.

3. A constant-speed scanning lens system according to claim 1, in which said constant-speed scanning lens system has the following numerical data:

| | | | |
|---|---|---|---|
| $r_1 = -0.2037$ | | | |
| | $d_1 = 0.0171$ | $n_1 = 1.63612$ | $\nu_1 = 55.4$ |
| $r_2 = -0.1573$ | | | |
| | $d_2 = 0.0191$ | | |
| $r_3 = -0.1479$ | | | |
| | $d_3 = 0.0163$ | $n_2 = 1.56459$ | $\nu_2 = 42.8$ |
| $r_4 = 5.4560$ | | | |
| | $d_4 = 0.0138$ | | |
| $r_5 = -6.1854$ | | | |
| | $d_5 = 0.0298$ | $n_3 = 1.61985$ | $\nu_3 = 53.2$ |
| $r_6 = -0.5090$ | | | |
| | $d_6 = 0.0008$ | | |
| $r_7 = -1.0001$ | | | |
| | $d_7 = 0.0420$ | $n_4 = 1.61985$ | $\nu_4 = 53.2$ |
| $r_8 = -0.3543$ | | | |
| | $d_8 = 0.0008$ | | |
| $r_9 = -0.9159$ | | | |
| | $d_9 = 0.0393$ | $n_5 = 1.61985$ | $\nu_5 = 53.2$ |
| $r_{10} = -0.3684$ | | | |
| | $f = 1$ | F/23.7 | $y = 0.589$ |
| | $|r_2/r_3| = 1.064$ | $\lambda = 632.8$ nm | | wherein reference symbols $r_1$ through $r_{10}$ respectively represent radii of curvature of respective lens surfaces, reference symbols $d_1$ through $d_9$ respectively represent thicknesses of respective lenses and airspaces between lenses, reference symbols $n_1$ through $n_5$ respectively represent refractive indices of respective lenses at the wavelength of 632.8 nm, reference symbols $\nu_1$ through $\nu_5$ respectively represent Abbe's numbers of respective lenses for d-line, reference symbol f represents the focal length of the lens system as a whole, reference symbol F represents the F number, and reference symbol y represents the image height.

4. A constant-speed scanning lens system according to claim 1, in which said constant-speed scanning lens system has the following numerical data:

| | | | |
|---|---|---|---|
| $r_1 = -0.1993$ | | | |
| | $d_1 = 0.0171$ | $n_1 = 1.63612$ | $\nu_1 = 55.4$ |
| $r_2 = -0.1565$ | | | |
| | $d_2 = 0.0191$ | | |
| $r_3 = -0.1488$ | | | |
| | $d_3 = 0.0163$ | $n_2 = 1.56459$ | $\nu_2 = 42.8$ |
| $r_4 = \infty$ | | | |
| | $d_4 = 0.0138$ | | |
| $r_5 = -3.3866$ | | | |
| | $d_5 = 0.0298$ | $n_3 = 1.61985$ | $\nu_3 = 53.2$ |
| $r_6 = -0.5834$ | | | |
| | $d_6 = 0.0008$ | | |
| $r_7 = -1.0150$ | | | |
| | $d_7 = 0.0420$ | $n_4 = 1.61985$ | $\nu_4 = 53.2$ |
| $r_8 = -0.3194$ | | | |
| | $d_8 = 0.0008$ | | |
| $r_9 = -1.1748$ | | | |
| | $d_9 = 0.0393$ | $n_5 = 1.61985$ | $\nu_5 = 53.2$ |
| $r_{10} = -0.4171$ | | | |
| | $d_{10} = 1.2166$ | | |
| $r_{11} = \infty$ | | | |
| | $d_{11} = 0.0135$ | $n_6 = 1.51462$ | $\nu_6 = 64.1$ |
| $r_{12} = \infty$ | | | |
| | $f = 1$ | F/23.7 | $y = 0.555$ |
| | $|r_2/r_3| = 1.052$ | $\lambda = 632.8$ nm | | wherein reference symbols $r_1$ through $r_{12}$ respectively represent radii of curvature of respective lens surfaces, reference symbols $d_1$ through $d_{11}$ respectively represent thicknesses of respective lenses and airspaces between lenses, reference symbols $n_1$ through $n_6$ respectively represent refractive indices of respective lenses at the wavelength of 632.8 nm, reference symbols $\nu_1$ through $\nu_6$ respectively represent Abbe's numbers of respective lenses for d-line, reference symbol f represents the focal length of the lens sytstem as a whole, reference symbol F represents the F number, and reference symbol y represents the image height.

5. A constant-speed scanning lens system according to claim 1, in which said constant-speed scanning lens system has the following numerical data:

| | | | |
|---|---|---|---|
| $r_1 = -0.2023$ | | | |
| | $d_1 = 0.0171$ | $n_1 = 1.63612$ | $\nu_1 = 55.4$ |
| $r_2 = -0.1586$ | | | |
| | $d_2 = 0.0191$ | | |
| $r_3 = -0.1500$ | | | |
| | $d_3 = 0.0163$ | $n_2 = 1.56459$ | $\nu_2 = 42.8$ |
| $r_4 = 78.8505$ | | | |
| | $d_4 = 0.0145$ | | |
| $r_5 = -3.3040$ | | | |
| | $d_5 = 0.0298$ | $n_3 = 1.61985$ | $\nu_3 = 53.2$ |
| $r_6 = -0.6149$ | | | |
| | $d_6 = 0.0008$ | | |
| $r_7 = -1.1101$ | | | |
| | $d_7 = 0.0420$ | $n_4 = 1.61985$ | $\nu_4 = 53.2$ |
| $r_8 = -0.3137$ | | | |
| | $d_8 = 0.0008$ | | |
| $r_9 = -1.1696$ | | | |
| | $d_9 = 0.0393$ | $n_5 = 1.61985$ | $\nu_5 = 53.2$ |
| $r_{10} = -0.4282$ | | | |
| | $f = 1$ | F/23.7 | $y = 0.589$ |
| | $|r_2/r_3| = 1.058$ | $\lambda = 632.8$ nm | | wherein reference symbols $r_1$ through $r_{10}$ respectively represent radii of curvature of respective lens surfaces, reference symbols $d_1$ through $d_9$ respectively represent thicknesses of respective lenses and airspaces between lenses, reference symbols $n_1$ through $n_5$ respectively represent refractive indices of respective lenses at the wavelength of 632.8 nm, reference symbols $\nu_1$ through $\nu_5$ respectively represent Abbe's numbers of respective lenses for d-line, reference symbol f represents the focal length of the lens system as a whole, reference symbol F represents the F number, and reference symbol y represents the image height.

6. A constant-speed scanning lens system according to claim 1, in which said constant-speed scanning lens system has the following numerical data:

| | | | |
|---|---|---|---|
| $r_1 = -0.1932$ | | | |
| | $d_1 = 0.0171$ | $n_1 = 1.63612$ | $\nu_1 = 55.4$ |
| $r_2 = -0.1525$ | | | |
| | $d_2 = 0.0191$ | | |
| $r_3 = -0.1472$ | | | |
| | $d_3 = 0.0163$ | $n_2 = 1.56459$ | $\nu_2 = 42.8$ |
| $r_4 = -4.0709$ | | | |
| | $d_4 = 0.0133$ | | |
| $r_5 = -2.2468$ | | | |
| | $d_5 = 0.0298$ | $n_3 = 1.61985$ | $\nu_3 = 53.2$ |
| $r_6 = -0.5051$ | | | |
| | $d_6 = 0.0008$ | | |
| $r_7 = -0.7321$ | | | |
| | $d_7 = 0.0420$ | $n_4 = 1.61985$ | $\nu_4 = 53.2$ |
| $r_8 = -0.3286$ | | | |
| | $d_8 = 0.0008$ | | |
| $r_9 = -1.4918$ | | | |
| | $d_9 = 0.0393$ | $n_5 = 1.61985$ | $\nu_5 = 53.2$ |
| $r_{10} = -0.4171$ | | | |
| | $d_{10} = 1.2166$ | | |
| $r_{11} = \infty$ | | | |
| | $d_{11} = 0.0135$ | $n_6 = 1.51462$ | $\nu_6 = 64.1$ |
| $r_{12} = \infty$ | | | |
| | $f = 1$ | F/23.7 | $y = 0.555$ |
| | $|r_2/r_3| = 1.036$ | $\lambda = 632.8$ nm | | wherein reference symbols $r_1$ through $r_{12}$ respectively represent radii of curvature of respective lens surfaces, reference symbols $d_1$ through $d_{11}$ respectively represent thicknesses of respective lenses and airspaces between lenses, reference symbols $n_1$ through $n_6$ respectively represent refractive indices of respective lenses at the wavelength of 632.8 nm, reference symbols $\nu_1$ through $\nu_6$ respectively represent Abbe's numbers of respective lenses for d-line, reference symbol f represents the focal length of the lens system as a whole, reference symbol F represents the F number, and reference symbol y represents the image height.

7. A constant-speed scanning lens system according to claim 1, in which said constant-speed scanning lens system has the following numerical data:

| | | | |
|---|---|---|---|
| $r_1 = -0.2104$ | | | |
| | $d_1 = 0.0200$ | $n_1 = 1.64488$ | $\nu_1 = 60.1$ |
| $r_2 = -0.1608$ | | | |
| | $d_2 = 0.0184$ | | |
| $r_3 = -0.1498$ | | | |
| | $d_3 = 0.0195$ | $n_2 = 1.57343$ | $\nu_2 = 42.8$ |
| $r_4 = 7.7024$ | | | |
| | $d_4 = 0.0154$ | | |
| $r_5 = -4.4646$ | | | |
| | $d_5 = 0.0274$ | $n_3 = 1.62791$ | $\nu_3 = 58.2$ |
| $r_6 = -0.5157$ | | | |
| | $d_6 = 0.0022$ | | |
| $r_7 = -1.1407$ | | | |
| | $d_7 = 0.0362$ | $n_4 = 1.62791$ | $\nu_4 = 58.2$ |
| $r_8 = -0.3560$ | | | |
| | $d_8 = 0.0022$ | | |
| $r_9 = -0.8187$ | | | |
| | $d_9 = 0.0350$ | $n_5 = 1.62791$ | $\nu_5 = 58.2$ |
| $r_{10} = -0.3713$ | | | |
| | $d_{10} = 1.2153$ | | |
| $r_{11} = \infty$ | | | |
| | $d_{11} = 0.0135$ | $n_6 = 1.52002$ | $\nu_6 = 64.1$ |
| $r_{12} = \infty$ | | | |
| | $f = 1$ | $F/29.15$ | $y = 0.555$ |
| | $|r_2/r_3| = 1.073$ | $\lambda = 514.5$ nm | | wherein reference symbols $r_1$ through $r_{12}$ respectively represent radii of curvature of respective lens surfaces, reference symbols $d_1$ through $d_{11}$ respectively represent thicknesses of respective lenses and airspaces between lenses, reference symbols $n_1$ through $n_6$ respectively represent refractive indices of respective lenses at the wavelength of 514.5 nm, reference symbols $\nu_1$ through $\nu_6$ respectively represent Abbe's numbers of respective lenses for d-line, reference symbol f respresents the focal length of the lens system as a whole, reference symbol F represents the F number, and reference symbol y represents the image height.

8. A constant-speed scanning lens system according to claim 1, in which said constant-speed scanning lens system has the following numerical data:

| | | | |
|---|---|---|---|
| $r_1 = -0.2138$ | | | |
| | $d_1 = 0.0198$ | $n_1 = 1.64384$ | $\nu_1 = 55.4$ |
| $r_2 = -0.1614$ | | | |
| | $d_2 = 0.0193$ | | |
| $r_3 = -0.1497$ | | | |
| | $d_3 = 0.0190$ | $n_2 = 1.57343$ | $\nu_2 = 42.8$ |
| $r_4 = 26.5199$ | | | |
| | $d_4 = 0.0153$ | | |
| $r_5 = -3.3375$ | | | |
| | $d_5 = 0.0271$ | $n_3 = 1.62768$ | $\nu_3 = 53.2$ |
| $r_6 = -0.5019$ | | | |
| | $d_6 = 0.0027$ | | |
| $r_7 = -1.1722$ | | | |
| | $d_7 = 0.0371$ | $n_4 = 1.62768$ | $\nu_4 = 53.2$ |
| $r_8 = -0.3583$ | | | |
| | $d_8 = 0.0027$ | | |
| $r_9 = -0.7758$ | | | |
| | $d_9 = 0.0342$ | $n_5 = 1.62768$ | $\nu_5 = 53.2$ |
| $r_{10} = -0.3722$ | | | |
| | $f = 1$ | $F/24.77$ | $\nu = 0.555$ |
| | $|r_2/r_3| = 1.078$ | $\lambda = 514.5$ nm | | wherein reference symbols $r_1$ through $r_{10}$ respectively represent radii of curvature of respective lens surfaces, reference symbols $d_1$ through $d_9$ respectively represent thicknesses of respective lenses and airspaces between lenses, reference symbols $n_1$ through $n_5$ respectively represent refractive indices of respective lenses at the wavelength of 514.5 nm, reference symbols $\nu_1$ through $\nu_5$ respectively represent Abbe's numbers of respective lenses for d-line, reference symbol f represents the focal length of the lens system as a whole, reference symbol F represents the F number, and reference symbol y represents the image height.

9. A constant-speed scanning lens system according to claim 1, in which said constant-speed scanning lens system has the following numerical data:

| | | | |
|---|---|---|---|
| $r_1 = -0.2216$ | | | |
| | $d_1 = 0.0190$ | $n_1 = 1.64384$ | $\nu_1 = 55.4$ |
| $r_2 = -0.1656$ | | | |
| | $d_2 = 0.0200$ | | |
| $r_3 = -0.1511$ | | | |
| | $d_3 = 0.0244$ | $n_2 = 1.57343$ | $\nu_2 = 42.8$ |
| $r_4 = 6.8525$ | | | |
| | $d_4 = 0.0153$ | | |
| $r_5 = -4.7140$ | | | |
| | $d_5 = 0.0271$ | $n_3 = 1.62768$ | $\nu_3 = 53.2$ |
| $r_6 = -0.4990$ | | | |
| | $d_6 = 0.0081$ | | |
| $r_7 = -1.2190$ | | | |
| | $d_7 = 0.0298$ | $n_4 = 1.62768$ | $\nu_4 = 53.2$ |
| $r_8 = -0.3637$ | | | |
| | $d_8 = 0.0081$ | | |
| $r_9 = -0.7141$ | | | |
| | $d_9 = 0.0298$ | $n_5 = 1.62768$ | $\nu_5 = 53.2$ |
| $r_{10} = -0.3638$ | | | |
| | $f = 1$ | $F/35$ | $y = 0.589$ |
| | $|r_2/r_3| = 1.096$ | $\lambda = 514.5$ nm | | wherein reference symbols $r_1$ through $r_{10}$ respectively represent radii of curvature of respective lens surfaces, reference symbols $d_1$ through $d_9$ respectively represent thicknesses of respective lenses and airspaces between lenses, reference symbols $n_1$ through $n_5$ respectively represent refractive indices of respective lenses at the wavelength of 514.5 nm, reference symbols $\nu_1$ through $\nu_5$ respectively represent Abbe's numbers of respective lenses for d-line, reference symbol f represents the focal length of the lens system as a whole, reference symbol F represents the F number, and reference symbol y represents the image height.

10. A constant-speed scanning lens system according to claim 1, in which said constant-speed scanning lens system has the following numerical data:

| | | | |
|---|---|---|---|
| $r_1 = -0.2354$ | | | |
| | $d_1 = 0.0187$ | $n_1 = 1.64384$ | $\nu_1 = 55.4$ |
| $r_2 = -0.1691$ | | | |
| | $d_2 = 0.0183$ | | |
| $r_3 = -0.1525$ | | | |
| | $d_3 = 0.0279$ | $n_2 = 1.57343$ | $\nu_2 = 42.8$ |
| $r_4 = 5.1238$ | | | |
| | $d_4 = 0.0153$ | | |
| $r_5 = -5.8207$ | | | |
| | $d_5 = 0.0271$ | $n_3 = 1.62768$ | $\nu_3 = 53.2$ |
| $r_6 = -0.6053$ | | | |
| | $d_6 = 0.0081$ | | |
| $r_7 = -1.2320$ | | | |
| | $d_7 = 0.0298$ | $n_4 = 1.62768$ | $\nu_4 = 53.2$ |
| $r_8 = -0.3855$ | | | |

-continued

| | $d_8 = 0.0081$ | | |
|---|---|---|---|
| $r_9 = -0.8546$ | | | |
| | $d_9 = 0.0298$ | $n_5 = 1.62768$ | $\nu_5 = 53.2$ |
| $r_{10} = -0.3529$ | | | |
| | $f = 1$ | $F/35$ | $y = 0.589$ |
| | $|r_2/r_3| = 1.109$ | $\lambda = 514.5$ nm | | wherein reference symbols $r_1$ through $r_{10}$ respectively represent radii of curvature of respective lens surfaces, reference symbols $d_1$ through $d_9$ respectively represent thicknesses of respective lenses and airspaces between lenses, reference symbols $n_1$ through $n_5$ respectively represent refractive indices of respective lenses at the wavelength of 514.5 nm, reference symbols $\nu_1$ through $\nu_5$ respectively represent Abbe's numbers of respective lenses for d-line, reference symbol f represents the focal length of the lens system as a whole, reference symbol F represents the F number, and reference symbol y represents the image height.

* * * * *